(12) United States Patent
Rios et al.

(10) Patent No.: US 9,742,924 B2
(45) Date of Patent: Aug. 22, 2017

(54) METHODS FOR HANDING OVER A CIRCUIT SWITCHED CALL TO AN INTERNET PROTOCOL CALL AND RELATED ELECTRONIC DEVICES AND COMPUTER PROGRAM PRODUCTS

(71) Applicant: Sony Corporation, Tokyo (JP)

(72) Inventors: Rodrigo Terra Rios, Malmo (SE); Mostafa Attariani, Malmo (SE); Ahmed Tayeh, Lund (SE); Mathias Jensen, Malmo (SE); Nabaz Barzangi, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 123 days.

(21) Appl. No.: 14/367,584

(22) PCT Filed: May 26, 2014

(86) PCT No.: PCT/JP2014/002753
§ 371 (c)(1),
(2) Date: Jun. 20, 2014

(87) PCT Pub. No.: WO2015/181845
PCT Pub. Date: Dec. 3, 2015

(65) Prior Publication Data
US 2015/0341500 A1 Nov. 26, 2015

(51) Int. Cl.
*H04M 7/12* (2006.01)
*H04M 7/00* (2006.01)
(Continued)

(52) U.S. Cl.
CPC ..... *H04M 7/1235* (2013.01); *H04M 3/42289* (2013.01); *H04M 7/0006* (2013.01);
(Continued)

(58) Field of Classification Search
CPC ......... H04L 45/22; H04L 12/66; H04L 45/00; H04M 7/0003; H04M 7/0006;
(Continued)

(56) References Cited

U.S. PATENT DOCUMENTS 4,747,124 A * 5/1988 Ladd ................. H04M 3/42314
379/198
4,783,796 A * 11/1988 Ladd ...................... H04M 3/38
379/212.01

(Continued)

OTHER PUBLICATIONS

Notification of Transmittal of the International Search Report and the Written Opinion of the International Searching Authority, or the Declaration, in corresponding PCT Application No. PCT/JP2014/002753 mailed Feb. 5, 2015 (10 pages).

(Continued)

*Primary Examiner* — Brian O'Connor
(74) *Attorney, Agent, or Firm* — Myers Bigel, P.A.

(57) ABSTRACT

A method includes establishing a circuit switched call with an automated answering system at a destination, the destination having a communication server associated therewith, transmitting a request to switch to Internet Protocol (IP) communication to the automated answering system, receiving an IP request acknowledgement message from the communication server responsive to transmitting the request to switch to IP communication, and establishing an IP communication session with the communication server responsive to receiving the IP request acknowledgement. Systems and computer program products are also disclosed.

20 Claims, 5 Drawing Sheets

(51) Int. Cl.
*H04M 3/42* (2006.01)
*H04W 36/00* (2009.01)

(52) U.S. Cl.
CPC ......... *H04M 7/128* (2013.01); *H04M 7/1285* (2013.01); *H04M 3/42153* (2013.01); *H04W 36/0022* (2013.01)

(58) Field of Classification Search
CPC ......... H04M 7/0057; H04M 2215/745; H04W 36/0083; H04W 28/18; H04W 84/042; H04W 36/14
See application file for complete search history.

(56) References Cited

U.S. PATENT DOCUMENTS

| | | | |
|---|---|---|---|
| 6,597,686 B1 | 7/2003 | Smyk | |
| 7,283,808 B2* | 10/2007 | Castell | H04L 12/589 370/401 |
| 7,668,158 B2* | 2/2010 | Armistead | H04L 12/5692 370/353 |
| 7,693,135 B2* | 4/2010 | Pershan | H04M 3/42297 370/328 |
| 7,742,768 B2* | 6/2010 | Liu | H04M 3/42314 455/410 |
| 7,756,514 B2* | 7/2010 | Muratore | H04M 3/54 379/211.03 |
| 7,873,001 B2* | 1/2011 | Silver | H04L 65/1016 370/329 |
| 8,023,479 B2* | 9/2011 | Silver | H04W 76/022 370/338 |
| 8,023,497 B2* | 9/2011 | Jayaram | H04W 36/06 370/352 |
| 8,068,421 B2* | 11/2011 | Williams | H04L 29/06027 370/235 |
| 8,271,025 B2* | 9/2012 | Brisebois | H04W 48/16 455/552.1 |
| 8,447,303 B2* | 5/2013 | Gisby | H04W 8/30 455/435.2 |
| 8,504,032 B2* | 8/2013 | Lott | G06Q 30/016 455/230 |
| 8,693,465 B2* | 4/2014 | West | H04L 41/0803 370/352 |
| 8,725,148 B2* | 5/2014 | George | H04L 12/66 370/331 |
| 9,042,266 B2* | 5/2015 | Livingston | H04W 48/16 370/254 |
| 9,204,359 B2* | 12/2015 | Sapkota | H04W 36/36 |
| 9,363,165 B2* | 6/2016 | Deshpande | H04L 45/22 |
| 2004/0034723 A1* | 2/2004 | Giroti | H04L 12/1822 710/8 |
| 2007/0149182 A1* | 6/2007 | Muratore | H04M 3/54 455/417 |
| 2007/0180485 A1* | 8/2007 | Dua | H04L 29/06027 725/114 |
| 2009/0022103 A1* | 1/2009 | Shatsky | H04W 36/0022 370/331 |
| 2009/0023450 A1* | 1/2009 | George | H04L 12/66 455/442 |
| 2009/0147778 A1* | 6/2009 | Wanless | G06Q 30/02 370/389 |
| 2009/0170557 A1* | 7/2009 | Chauhan | H04W 36/14 455/552.1 |
| 2011/0110511 A1* | 5/2011 | Vendrow | H04L 12/66 379/201.04 |
| 2012/0321058 A1* | 12/2012 | Eng | H04L 45/00 379/90.01 |
| 2015/0111535 A1* | 4/2015 | Song | H04W 12/06 455/411 |

OTHER PUBLICATIONS

Notification of Transmittal of the International Preliminary Report on Patentability, PCT Application No. PCT/JP2014/002753, mailed Aug. 12, 2016, 14 pages.

* cited by examiner

METHODS FOR HANDING OVER A CIRCUIT SWITCHED CALL TO AN INTERNET PROTOCOL CALL AND RELATED ELECTRONIC DEVICES AND COMPUTER PROGRAM PRODUCTS

CROSS-REFERENCE TO RELATED APPLICATION

This application is a 35 U.S.C. §371 national stage application of PCT International Application No. PCT/JP2014/002753, filed on 26 May 2014, the disclosure and content of which is incorporated by reference herein as if set forth in its entirety.

BACKGROUND OF THE INVENTION

The present invention relates to communication networks, and, more particularly, to methods, electronic devices, and computer program products for setting up Internet Protocol (IP) connections.

Traditional phone calls involved circuit switched connections between one phone and another phone. Modern communication devices, such as mobile terminals, may include the ability to make both circuit switched calls over a telecommunication infrastructure as well as form packet switched connections over the Internet using, for example, Internet Protocol (IP) technology. The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

SUMMARY

In some embodiments of the present inventive subject matter, a method comprises establishing a circuit switched call with an automated answering system at a destination, the destination having a communication server associated therewith, transmitting a request to switch to Internet Protocol (IP) communication to the automated answering system, receiving an IP request acknowledgement message from the communication server responsive to transmitting the request to switch to IP communication, and establishing an IP communication session with the communication server responsive to receiving the IP request acknowledgement.

In other embodiments, the method further comprises terminating the circuit switched call with the automated answering system responsive to establishing the IP communication session.

In still other embodiments, terminating the circuit switched call comprises receiving a notification from the communication server that the circuit switched call is associated with the IP communication session and terminating the circuit switched call responsive to receiving the notification.

In still other embodiments, transmitting the request to switch to IP communication comprises transmitting the request to switch to IP communication to the automated answering system responsive to receiving a communication from the automated answering system presenting an option to switch to IP communication.

In still other embodiments, the method further comprises downloading an IP communication application from the communication server responsive to receiving the IP request acknowledgement and launching the IP communication application.

In still other embodiments, establishing the IP communication session comprises transmitting an IP communication session origination request message to the communication server responsive to launching the IP communication application.

In still other embodiments, the method further comprises receiving a request for information from the communication server responsive to establishing an IP communication session and transmitting the information that was requested to the communication server.

In still other embodiments, establishing the circuit switched call comprises establishing the circuit switched call over a Global System for Mobile communication (GSM) network.

In further embodiments of the inventive subject matter, a system comprises a processor and a memory coupled to the processor and comprising computer readable program code embodied in the memory that when executed by the processor causes the processor to perform operations. The operations comprise establishing a circuit switched call with an automated answering system at a destination, the destination having a communication server associated therewith, transmitting a request to switch to Internet Protocol (IP) communication to the automated answering system, receiving an IP request acknowledgement message from the communication server responsive to transmitting the request to switch to IP communication, and establishing an IP communication session with the communication server responsive to receiving the IP request acknowledgement.

In still further embodiments, the operations further comprise terminating the circuit switched call with the automated answering system responsive to establishing the IP communication session.

In still further embodiments, terminating the circuit switched call comprises receiving a notification from the communication server that the circuit switched call is associated with the IP communication session, and terminating the circuit switched call responsive to receiving the notification.

In still further embodiments, transmitting the request to switch to IP communication comprises transmitting the request to switch to IP communication to the automated answering system responsive to receiving a communication from the automated answering system presenting an option to switch to IP communication.

In still further embodiments, the operations further comprise downloading an IP communication application from the communication server responsive to receiving the IP request acknowledgement and launching the IP communication application.

In still further embodiments, establishing the IP communication session comprises transmitting an IP communication session origination request message to the communication server responsive to launching the IP communication application.

In other embodiments of the inventive subject matter, a computer program product comprises a tangible computer readable storage medium comprising computer readable program code embodied in the medium that when executed by a processor causes the processor to perform operations. The operations comprise establishing a circuit switched call with an automated answering system at a destination, the destination having a communication server associated therewith, transmitting a request to switch to Internet Protocol (IP) communication to the automated answering system, receiving an IP request acknowledgement message from the communication server responsive to transmitting the request to switch to IP communication, and establishing an IP communication session with the communication server responsive to receiving the IP request acknowledgement.

In still other embodiments, the operations further comprise terminating the circuit switched call with the automated answering system responsive to establishing the IP communication session.

In still other embodiments, terminating the circuit switched call comprises receiving a notification from the communication server that the circuit switched call is associated with the IP communication session and terminating the circuit switched call responsive to receiving the notification.

In still other embodiments, transmitting the request to switch to IP communication comprises transmitting the request to switch to IP communication to the automated answering system responsive to receiving a communication from the automated answering system presenting an option to switch to IP communication.

In still other embodiments, the operations further comprise downloading an IP communication application from the communication server responsive to receiving the IP request acknowledgement and launching the IP communication application.

In still other embodiments, establishing the IP communication session comprises transmitting an IP communication session origination request message to the communication server responsive to launching the IP communication application.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
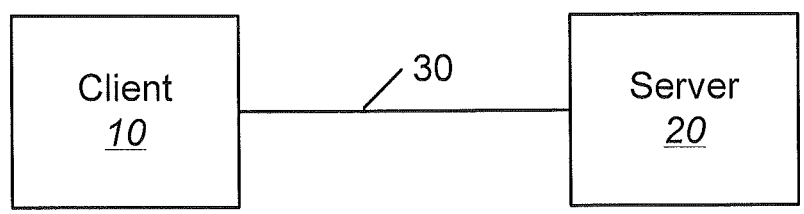
FIG. 1 is a block diagram that illustrates a client-server environment in accordance with some embodiments of the present inventive subject matter.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the term "data processing facility" includes, but it not limited to, a hardware element, firmware component, and/or software component. A data processing system may be configured with one or more data processing facilities.

As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Embodiments are described herein in the context of a wireless communications network based on a Global System for Mobile (GSM) communication infrastructure. It will be understood that the disclosed examples are for purposes of illustration and that other types of communication infrastructures that support circuit switched connections and packet switched or Internet Protocol (IP) can be used in accordance with further embodiments of the inventive subject matter.

For purposes of illustration, embodiments of the present invention are described herein in the context of a mobile terminal. It will be understood, however, that the present invention is not limited to such embodiments and may be embodied generally as an electronic device that is capable of communication over a network, such as the Internet, and using one or more communication protocols, such as the TCP/IP and/or Short Messaging Service (SMS) protocols. Moreover, some embodiments of the present invention are described herein in the context of a "chat session." A chat session can refer to any kind of communication over the Internet and includes, for example, direct one-on-one chat or text-based group chat using tools, such as Instant Messaging (IM) applications/clients.

Some embodiments of the inventive subject matter stem from a realization that an electronic communication device may establish a circuit switched call or connection with a destination, such as an automated answering system, for example. The calling device may then transmit a request to the destination requesting to switch to an IP communication connection. The destination may acknowledge the request to switch to an IP communication session and the electronic device may then establish an IP communication session with a communication server that is also associated with the destination. Once the IP communication session is established, the circuit switched connection with the automated answering system, for example, may be terminated. In some embodiments, when the electronic device communicates the request to switch to an IP communication session, the destination may download an application, for example, from the communication server to the electronic device. A user may then launch the application on the electronic device to establish an IP connection with the communication server.

Embodiments according to the invention can operate in a logically separated client side/server side-computing environment, sometimes referred to hereinafter as a client/server environment. As shown in FIG. 1, a client 10 may communicate with a server 20 over a wireless and/or wireline communication medium 30. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a Web browser, that requests information, such as web pages, from a server under the control of a user. Examples of clients include browsers such as Safari® (Apple, Inc., Cupertino, Calif.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Figure 2:
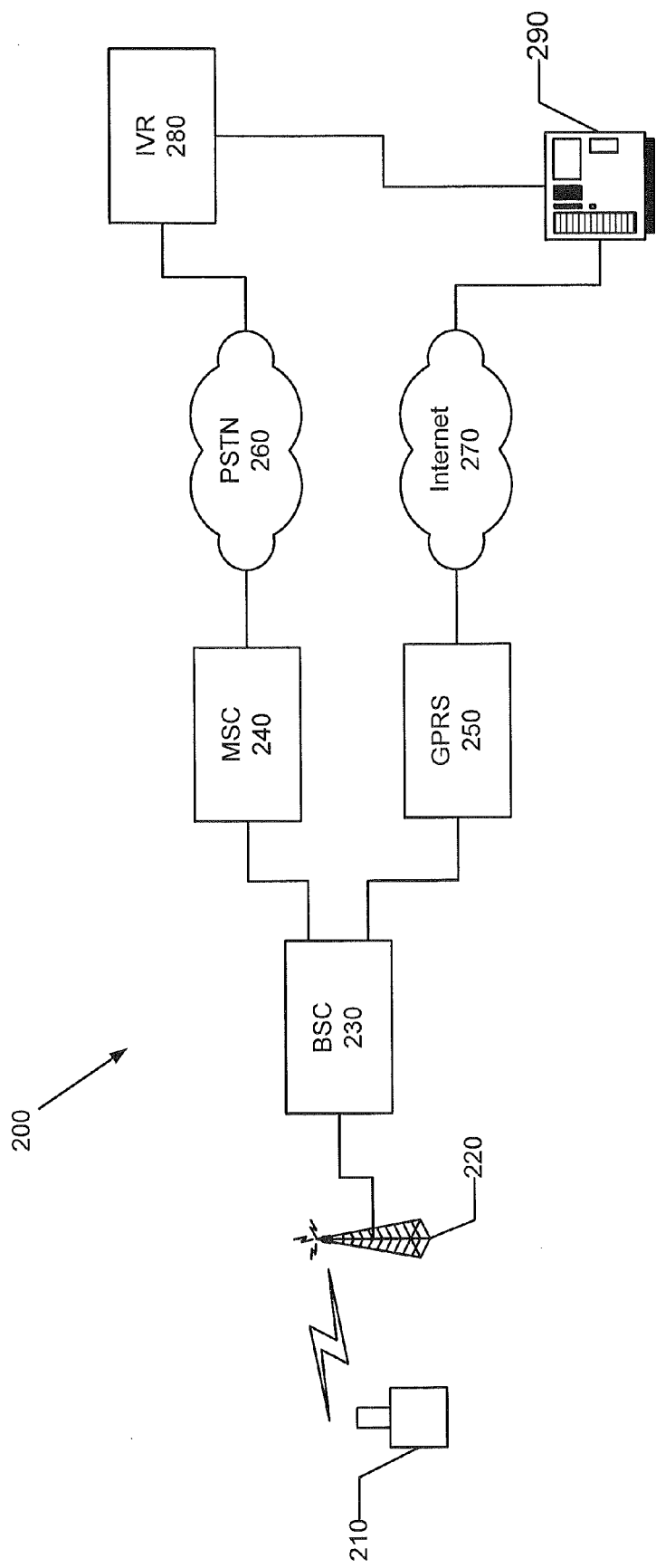
FIG. 2 is a is a block diagram that illustrates a communication network in accordance with some embodiments of the present inventive subject matter.

Referring now to FIG. 2, a network architecture, according to some embodiments of the present inventive subject matter, comprises GSM infrastructure components including a base station transceiver (BTS) 220, a base station controller (BSC) 230, a mobile switching center (MSC) 240, and a general packet radio service (GPRS). The GSM infrastructure components are coupled to a destination via the Public Switched Telephone Network (PSTN) 260 and the Internet 270. The destination may include an automated answering system, such as an interactive voice response (IVR) system 280 along with a communication server 290.

The BTS 220 and BSC 230 comprise the base station subsystem (BSS), which is responsible for handling traffic and signaling between a mobile terminal, such as mobile terminal 210, and the network switching subsystem comprising MSC 240 and GPRS 250. The BTS 220 contains the equipment for transmitting and receiving radio signals including transceivers and antennas along with equipment for encrypting and decrypting communication with the BSC 230. The BSC 230 typically controls multiple BTSs 220 and is used to manage the allocation of radio channels, receive measurements from the mobile terminals, and control handovers of mobile terminals between BTSs 220.

The MSC 240 is the primary service delivery node for a GSM telecommunications infrastructure and is responsible for routing circuit switched voice calls as well as other services, such as conference calls, FAX, and circuit switched data calls to destinations. The MSC 240 may set up and release end-to-end connections with a destination, such as a circuit switched connection between the mobile terminal 210 and the IVR 280 over the PSTN 260.

The GPRS 250 provides mobility management, session management, and transport for IP packet services between, for example, mobile terminals 210 that have an IP communication capability and a communication server 290 over the Internet 270. The communication server 290 may be a data processing facility that includes a TCP/IP session manager module that is configured to manage communication connections, such as TCP/IP connections, between electronic devices, such as the mobile terminal 210.

Additional networks may also be used to couple the MSC 240 and GPRS 250 to the IVR 280 and communication server 290 including, but not limited to, a wide area network, a local area network, an Intranet, or other private network, which may not accessible by the general public. Thus, the MSC 240 and GPRS 250 may be coupled to the IVR 280 and communication server 290 using a combination of public and private networks or a virtual private network (VPN). Moreover, electronic device 210 is described as a mobile terminal 210 for purposes of illustrating some embodiments of the inventive subject matter. It will be understood that the mobile terminal may be any electronic device that is capable of establishing both circuit switched and packet switched communication sessions via a network using, for example, a communication protocol, such as TCP/IP.

Although FIG. 2 illustrates an exemplary communication network, it will be understood that the present invention subject matter is not limited to such configurations, but is intended to encompass any configuration capable of carrying out the operations described herein.

Figure 3:
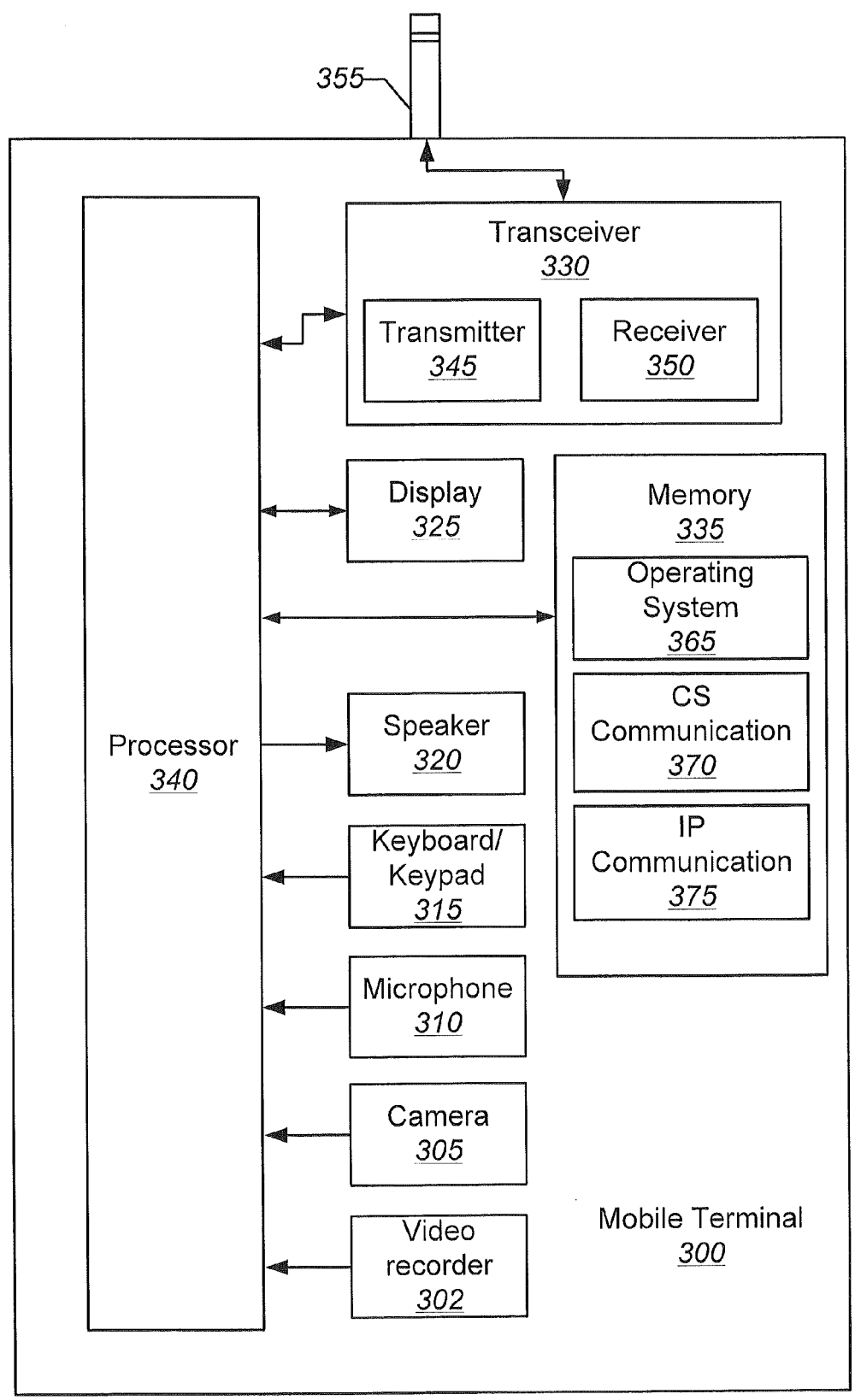
FIG. 3 is a block diagram that illustrates an electronic device/mobile terminal in accordance with some embodiments of the present inventive subject matter.

Referring now to FIG. 3, an exemplary mobile terminal 300 that may be used to implement mobile terminal 210 of FIG. 2, in accordance with some embodiments of the present inventive subject matter, includes a video recorder 302, a camera 305, a microphone 310, a keyboard/keypad 315, a speaker 320, a display 325, a transceiver 330, and a memory 335 that communicate with a processor 340. The transceiver 330 comprises a transmitter circuit 345 and a receiver circuit 350, which respectively transmit outgoing radio frequency signals to base station transceivers and receive incoming radio frequency signals from the base station transceivers via an antenna 355. The radio frequency signals transmitted between the mobile terminal 300 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 300 may be included in many conventional mobile terminals and their functionality is generally known to those skilled in the art.

The processor 340 communicates with the memory 335 via an address/data bus. The processor 340 may be, for example, a commercially available or custom microprocessor. The memory 335 is representative of the one or more memory devices containing the software and data used to provide a phone-based Web server with a private IP address, in accordance with some embodiments of the present invention. The memory 335 may include, but is not limited to, the following types of devices: cache, ROM, PROM, EPROM, EEPROM, flash, SRAM, and DRAM.

As shown in FIG. 3, the memory 335 may contain up to three or more categories of software and/or data: the operating system 365, a circuit switching communication module 370, and an IP communication module 375. The operating system 365 generally controls the operation of the mobile terminal 300. In particular, the operating system 365 may manage the mobile terminal's software and/or hardware resources and may coordinate execution of programs by the processor 340. The CS communication module 370 may be configured to originate, receive, and manage circuit switched calls over a communication network, such as the communication network of FIG. 2. For example, the CS communication module 370 may be used to establish a circuit switched call between the mobile terminal 210 and the IVR system 280 of FIG. 2. The IP communication module 375 may be configured to establish and manage a packet switched or IP call over a communication network, such as the communication network of FIG. 2. For example, the IP communication module 375 may be used to establish an IP call between the mobile terminal 210 and the communication server 290. In some embodiments of the inventive subject matter, the IP communication module 375 may be downloaded to the mobile terminal 300 from, for example, the communication server 290 or other source site.

Although FIG. 3 illustrates an exemplary software and hardware architecture that may be used to provide a mobile terminal that can switch between a circuit switched call and an IP call or session it will be understood that embodiments of the present invention are not limited to such a configuration, but are intended to encompass any configuration capable of carrying out the operations described herein.

Computer program code for carrying out operations of devices and/or systems discussed above with respect to FIGS. 1-3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Moreover, the functionality of the mobile terminal 210, IVR 280, communication server 290, and mobile terminal 300 of FIGS. 2 and 3 may each be implemented as a single processor system, a multi-processor system, or even a network of stand-alone computer systems, in accordance with various embodiments of the inventive subject matter.

Figure 4:
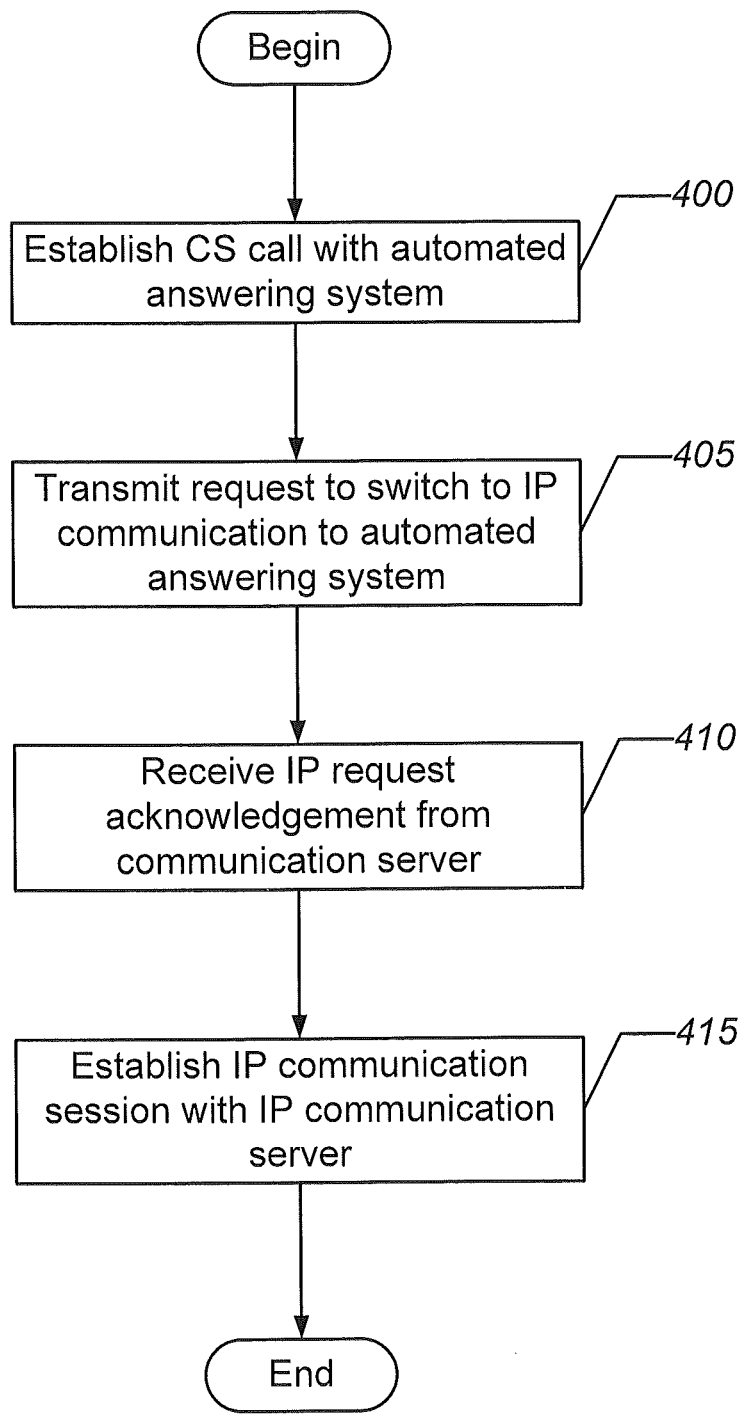
FIGS. 4 and 5 are flowcharts that illustrate operations for handing over a circuit switched call to an Internet Protocol (IP) call in accordance with some embodiments of the inventive subject matter.
Figure 5:
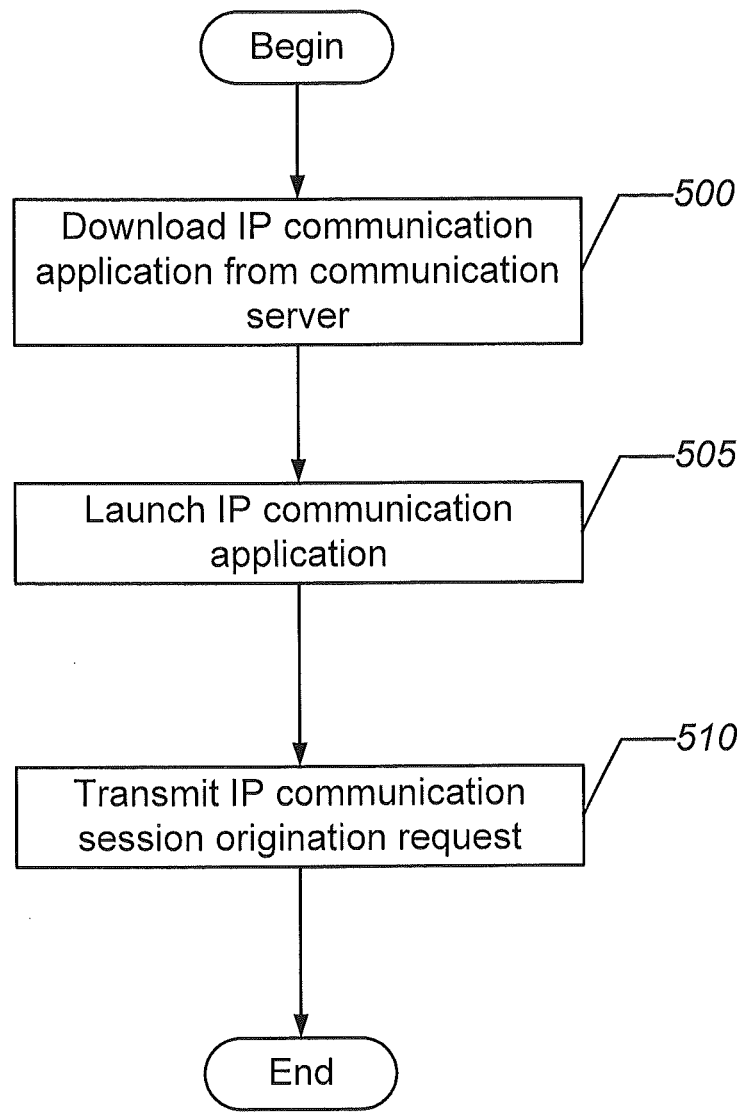

FIGS. 4 and 5 are flowcharts that illustrate exemplary operations for switching between a circuit switched call and an IP call/communication session according to some embodiments of the inventive subject matter.

Referring now to FIG. 4, operations begin at block 400 where the mobile terminal 210 establishes a circuit switched call with the IVR 280. The IVR 280 may provide an answering system with voice recognition capability to allow a user to respond to prompts using voice commands and/or through responses using a keypad on the mobile terminal 210. In some embodiments, the answering system 280 may not provide voice recognition and user input is typically provided solely through a keypad. The IVR 280 may provide the user of the mobile terminal 210 with an option of using the IVR 280 to communicate with the destination to obtain and/or communicate whatever information the user desires and/or wait for a live attendant to join the call. The IVR 280 may also provide the user of the mobile terminal 210 with an option of establishing an IP call.

At block 405, the user may use the mobile terminal 210 to transmit a request to the IVR 280 to switch to IP communication. The IVR 280 may send the mobile terminal 210 an IP request acknowledgement at block 410.

Referring now to FIG. 5, in some embodiments, the IP request acknowledgement may include a message containing a Uniform Resource Locator (URL) link and/or a Short Message Service (SMS) communication to assist the user of the mobile terminal 210 in downloading an IP communication application, such as IP communication module 375, to facilitate communication with the communication server 290 at block 500. If the mobile terminal 210 already has the IP communication module 375 installed for communicating with the communication server 290, then the user need not download the IP communication module 375 unless an updated version of the IP communication module 375 is desired.

The user may then launch the IP communication module 375 on the mobile terminal 210 at block 505 and transmit an IP communication session origination request message to the communication server 290 at block 510.

Returning to FIG. 4, the user may then establish an IP communication session with the communication server 290 at block 415, which can be used to communication information between the mobile terminal 210 and the communication server 290 over, for example, a Web interface using a browser. The communication server 290 may be configured to request information from the user, which the user can then provide through the IP communication module 375 on the mobile terminal 210. The user may also review and/or download information, such as forms and the like, from the communication server 290 using the IP communication module 375 on the mobile terminal 210.

In some embodiments, it may no longer be necessary to maintain both the circuit switched call with the IVR 280 and the IP call with the communication server 290. Once the IP communication is established, the mobile terminal 210 may receive a notification from the communication server 290 that the circuit switched call is associated with the IP communication session. The user may then elect to use the mobile terminal 210 to terminate the original circuit switched call with the IVR 280 and continue communicating with the destination by way of the IP communication session with the communication server 290.

Some embodiments of the inventive subject matter may be illustrated by way of example with respect to a customer calling a medical practice. The customer may use a mobile terminal 210 to call a medical practice to book an appointment or ask for advice. The customer establishes a circuit switched connection with an IVR system 280, which presents the customer with an option of establishing an IP connection with a communication server. The customer may elect to establish the IP connection and is sent a SMS message, for example, with a link to where the customer can download a communication application to the mobile terminal 210 to establish an IP session with the medical practice's communication server 290. The customer proceeds to install and the communication application to establish an IP communication session with the communication server 290. The circuit switched call with the IVR system 280 and the IP communication session with the communication server 290 are linked and the customer is presented with the option of terminating the connection with the IVR system 280. The customer can then use the IP communication session with the communication server 290 to book an appointment, to review information on various medications, to complete a medical history questionnaire, or other types of information exchanges. The customer may also be able to select an option of engaging in an online chat session with an attendant or a request a call back from an attendant. Other services and features may be further provided using the IP communication session in accordance with various embodiments of the inventive subject matter.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
    establishing a circuit switched call with an automated answering system at a destination, the destination having a communication server associated therewith;
    transmitting a request to establish an Internet Protocol (IP) communication session to the automated answering system using the circuit switched call;
    receiving an IP request acknowledgement message from the communication server responsive to transmitting the request to establish the IP communication session; and
    establishing the IP communication session with the communication server responsive to receiving the IP request acknowledgement.

2. The method of claim 1, further comprising:
    terminating the circuit switched call with the automated answering system responsive to establishing the IP communication session.

3. The method of claim 2, wherein terminating the circuit switched call comprises:
    receiving a notification from the communication server that the circuit switched call is associated with the IP communication session; and
    terminating the circuit switched call responsive to receiving the notification.

4. The method of claim 1, wherein transmitting the request to establish the IP communication session comprises:
    transmitting the request to establish the IP communication session to the automated answering system responsive to receiving a communication from the automated answering system presenting an option to establish the IP communication session.

5. The method of claim 1, further comprising:
    downloading an IP communication application from the communication server responsive to receiving the IP request acknowledgement; and
    launching the IP communication application.

6. The method of claim 5, wherein establishing the IP communication session comprises:
    transmitting an IP communication session origination request message to the communication server responsive to launching the IP communication application.

7. The method of claim 1, further comprising:
    receiving a request for information from the communication server responsive to establishing the IP communication session; and
    transmitting the information that was requested to the communication server.

8. The method of claim 1, wherein establishing the circuit switched call comprises establishing the circuit switched call over a Global System for Mobile communication (GSM) network.

9. A system, comprising:
    a processor; and
    a memory coupled to the processor and comprising computer readable program code embodied in the memory that when executed by the processor causes the processor to perform operations comprising:
    establishing a circuit switched call with an automated answering system at a destination, the destination having a communication server associated therewith;
    transmitting a request to establish an Internet Protocol (IP) communication session to the automated answering system using the circuit switched call;
    receiving an IP request acknowledgement message from the communication server responsive to transmitting the request to establish the IP communication session; and
    establishing the IP communication session with the communication server responsive to receiving the IP request acknowledgement.

10. The system of claim 9, wherein the operations further comprise:
    terminating the circuit switched call with the automated answering system responsive to establishing the IP communication session.

11. The system of claim 10, wherein terminating the circuit switched call comprises:
    receiving a notification from the communication server that the circuit switched call is associated with the IP communication session; and
    terminating the circuit switched call responsive to receiving the notification.

12. The system of claim 9, wherein transmitting the request to establish the IP communication session comprises:

transmitting the request to establish the IP communication session to the automated answering system responsive to receiving a communication from the automated answering system presenting an option to establish the IP communication session.

13. The system of claim 9, wherein the operations further comprise:
downloading an IP communication application from the communication server responsive to receiving the IP request acknowledgement; and
launching the IP communication application.

14. The system of claim 13, wherein establishing the IP communication session comprises:
transmitting an IP communication session origination request message to the communication server responsive to launching the IP communication application.

15. A computer program product, comprising:
a non-transitory computer readable storage medium comprising computer readable program code embodied in the medium that when executed by a processor causes the processor to perform operations comprising:
establishing a circuit switched call with an automated answering system at a destination, the destination having a communication server associated therewith;
transmitting a request to establish an Internet Protocol (IP) communication session to the automated answering system using the circuit switched call;
receiving an IP request acknowledgement message from the communication server responsive to transmitting the request to establish the IP communication session; and
establishing the IP communication session with the communication server responsive to receiving the IP request acknowledgement.

16. The computer program product of claim 15, wherein the operations further comprise:
terminating the circuit switched call with the automated answering system responsive to establishing the IP communication session.

17. The computer program product of claim 16, wherein terminating the circuit switched call comprises:
receiving a notification from the communication server that the circuit switched call is associated with the IP communication session; and
terminating the circuit switched call responsive to receiving the notification.

18. The computer program product of claim 15, wherein transmitting the request to establish the IP communication session comprises:
transmitting the request to establish the IP communication session to the automated answering system responsive to receiving a communication from the automated answering system presenting an option to establish the IP communication session.

19. The computer program product of claim 15, wherein the operations further comprise:
downloading an IP communication application from the communication server responsive to receiving the IP request acknowledgement; and
launching the IP communication application.

20. The computer program product of claim 19, wherein establishing the IP communication session comprises:
transmitting an IP communication session origination request message to the communication server responsive to launching the IP communication application.

* * * * *